April 25, 1939.  E. J. BRANSON  2,155,889
ROAD SURFACING DEVICE
Filed Nov. 9, 1937  2 Sheets-Sheet 1
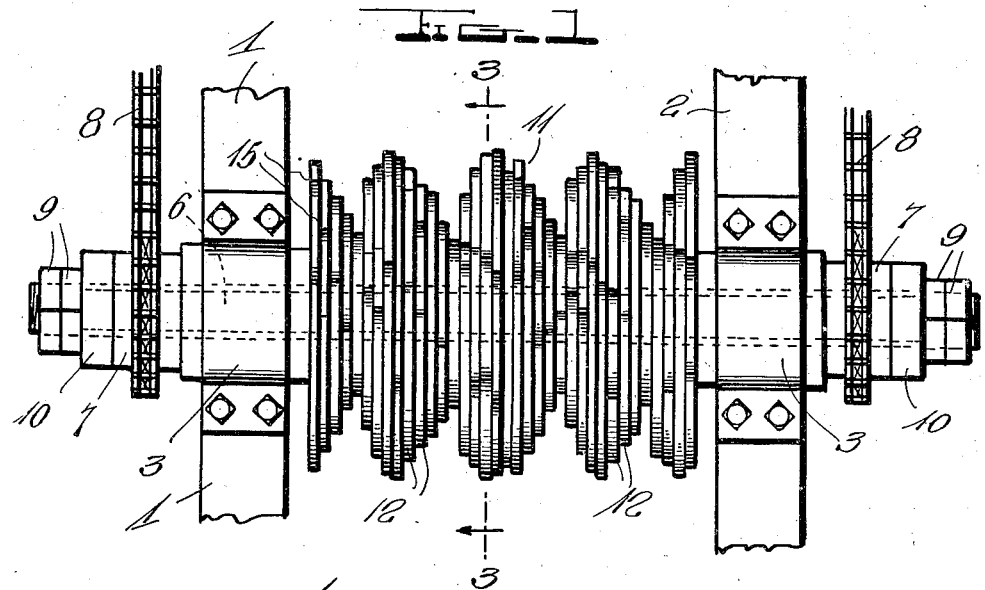
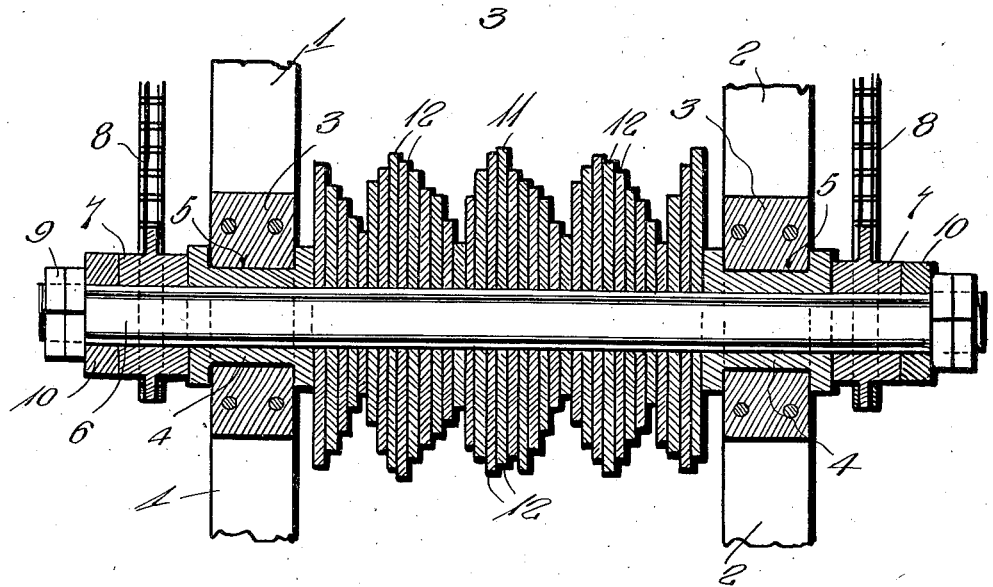
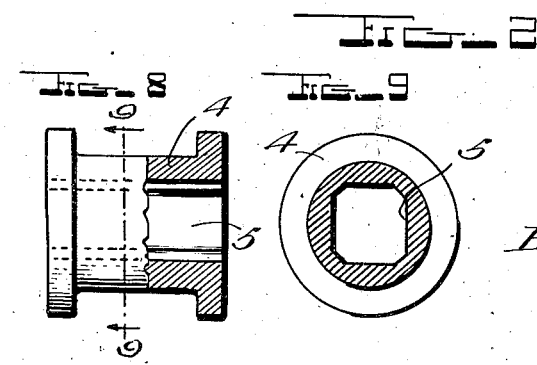
INVENTOR.
Earl J. Branson,
BY
ATTORNEY.

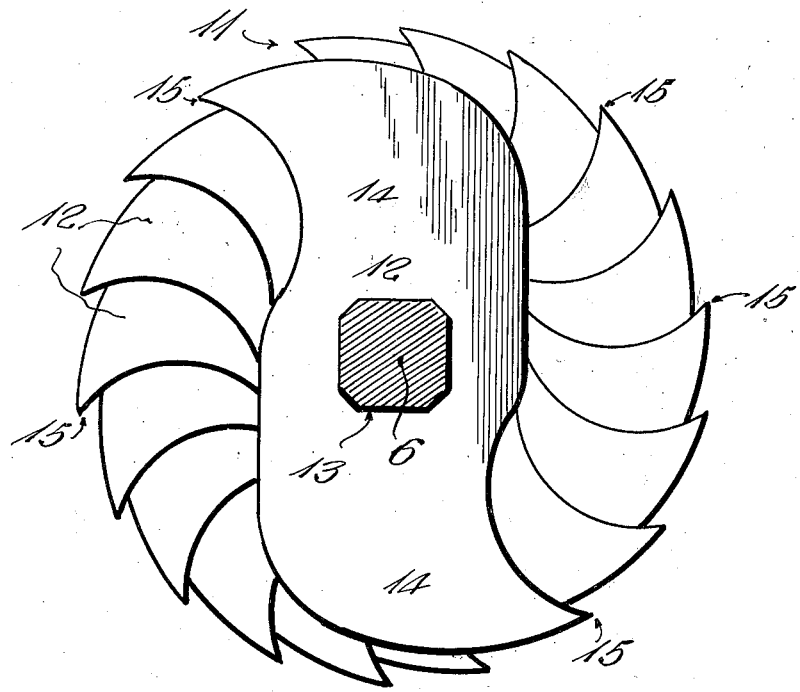
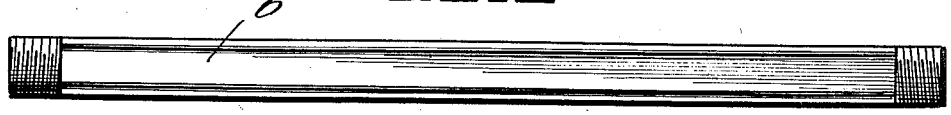
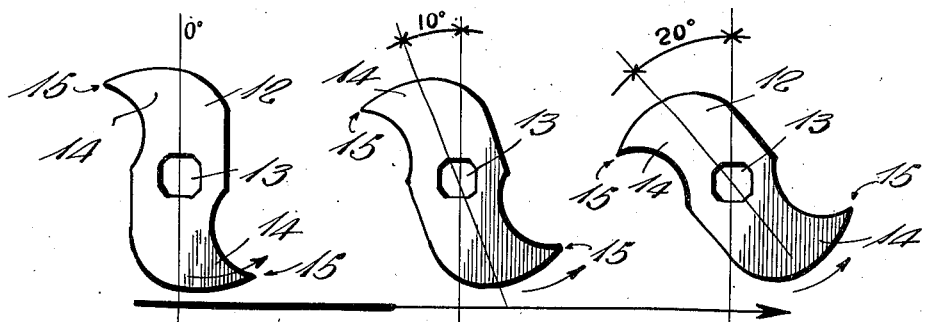

Patented Apr. 25, 1939

2,155,889

UNITED STATES PATENT OFFICE 2,155,889

ROAD SURFACING DEVICE

Earl J. Branson, Pasadena, Calif.

Application November 9, 1937, Serial No. 173,688

1 Claim. (Cl. 262—19)

This invention relates to a road surfacing device or rotary cutter for trimming asphalt, macadam or other pavement surfaces which are rough and required to be smoothed down by removal of corrugations or projections in order that by the removal of such projections and the filling of depressions the road surface may be restored to a substantially even and smooth condition.

Rotary picks, scrapers or cutters of the types heretofore used for the purpose have been found objectionable and defective for the purpose, as they tend to catch in and lift up or tear away any portions of the surface which may be thin or weak.

The object of my invention is to provide a rotary surfacing cutter which is not subject to this objection and will operate to smoothly remove projecting portions of the road surface without lifting or tearing away even very thin or weak portions of the surface.

In the accompanying drawings,

Fig. 1 is a top plan view of a rotary surfacer embodying my invention as mounted upon a suitable carrier vehicle, a portion of which is shown.

Fig. 2 is a horizontal section of the same.

Fig. 3 is a vertical section on line 3—3 of Fig. 1.

Fig. 4 is a view of the cutter shaft.

Figs. 5, 6 and 7 are views of several cutter blades showing, exemplificatively, the angular arrangement of successive blades about the cutter shaft.

Fig. 8 is a view of one of the bearing bushings.

Fig. 9 is a section on line 9—9 of Fig. 8.

Referring now more particularly to the drawings, 1 and 2 represent spaced, parallel frame beams or supports provided with alined bearings 3 in which are journaled flanged bushings 4 provided with angular bores 5. Through these bores of the bushings project a shaft 6 of corresponding form in cross-section, the ends of the shaft projecting beyond the beams 1 and 2 and the bushings 4 and carrying sprocket gears 7 for engagement with chains 8 whereby the shaft is driven. The ends of the shaft 6 are threaded to receive securing and lock nuts 9 holding in position washers 10 which retain the sprocket wheels 7 against longitudinal displacement and also the shaft from endwise movement in the bushings. The bushings may be applied and removed when the cap members of the bearings 3 are detached, while upon removal of the securing and lock nuts the sprocket wheels and shaft may be removed from the bushings without displacing the shaft from the latter. The sprocket wheels 7 have bores of angular form receiving the shaft 6 by which they are fitted upon the shaft to turn therewith.

The shaft 6 may be of any desired angular form in cross-section, and mounted on this shaft between the frame members 1 and 2 and in bearing contact with the inner flanged ends of the bushing 4 is a cutter 11 comprising a series of cutter blades 12, said blades being arranged side by side. Each of these blades comprises a body of substantially oblong rectangular shape and formed centrally with an angular opening 13 for passage of the shaft 6 and by which it is fitted thereon to rotate therewith. The ends of each blade are shaped to provide fluke like cutters 14 projecting in opposite directions and terminating in cutting points 15.

In practice, angular openings 13 of the blades 12, beginning with one end one of the series and ending with the other end one of the series, are set at different angles so as to dispose the cutting ends of the blades of the series spirally about the shaft, from end to end of the series. Preferably the series of blades are thirty-six in number, and arranged by their angular openings at angles of ten degrees apart about the shaft, as indicated in the exemplified arrangement of three adjacent blades shown in Figs. 5, 6 and 7, so that throughout the series of blades the cutting points of the flukes of adjacent blades have a ten degree angle advance of one another in the direction of rotation of the cutter. By the described manner of mounting the blades on the shaft simplicity of construction is not only ensured, but provision is made to permit of the accurate fitting of the blades in position and the ready and convenient mounting and demounting of the blades in assembling the cutter and in removing blades for sharpening, repairs or other purposes.

In practice, the supporting frame bars 1 and 2 may constitute portions of an automobile truck or other vehicle, or portions of a cutter frame mounted on such a vehicle in such manner as to dispose the cutter in proper relationship to the road surface to be acted upon, and the drive chains 8 may be driven from the drive mechanism of the vehicle or in any other suitable manner. It will, of course, be understood that provision may be made for adjusting the cutter with relation to the pavement or road surface as occasion may require in the working operation thereof or to throw the cutter into and out of working action. Provision may also be made for regulating the speed of the cutter as circumstances may require. In the operation of the cutter, viewed from the direction shown in Fig. 3, the shaft 6 and blades 12 are rotated as a unit in a counter-clockwise direction and the blades are so adjusted with relation to the surface to be acted upon that their cutting points 15 contact with the uneven portions or raised surfaces of the pavement and smoothly and cleanly remove the same without any tendency to lift or tear up any portions of the surface at thin or weak points thereof. This is due to the described arrangement of the blades and their closely related staggered cutting action and their arc of cut, by which any tendency of the blades to catch into and tear up weak portions of the road surface is avoided .

From the foregoing description, taken in connection with the drawings, the construction, mode of operation and advantages of my improved surfacing cutter will be readily understood by those versed in the art without a further and extended description. While the structure shown is preferred, it will, of course, be understood that changes in the form, arrangement and proportions of the parts may be varied from those shown within the scope of the appended claim without departing from the spirit or sacrificing any of the advantages of the invention.

What I claim is:

In a road surfacing cutter, spaced supports having bearing openings therein, spool shaped bushings journaled in said openings, said bushings being provided with angular bores and having their flanges engaging opposite sides of the bearings, a rotary shaft of angular form conforming to said bores and having its end portions extending through and beyond the bearings, a series of flat cutting blades mounted side by side in abutting relationship on the shaft between the bushings, each blade having end portions provided with fluke like cutters projecting in opposite directions at diametrically opposite sides of the shaft, said blades being formed with angular openings set at different relative angles whereby they are mounted at different angles on the shaft so that their end portions are disposed spirally about the shaft from one end to the other end of the series, the outermost blades of the series bearing against the inner flanges of the bushings, sprocket wheels mounted on the ends of the shaft beyond the bushings, and retaining means on the ends of the shaft holding said sprocket wheels confined between the same and the outer flanges of the bushings.

EARL J. BRANSON.